United States Patent [19]

Mooney

[11] 4,455,005
[45] Jun. 19, 1984

[54] LOCKING TRIPOD LEG
[75] Inventor: Paul C. Mooney, Northbrook, Ill.
[73] Assignee: Quick-set, Incorporated, Northbrook, Ill.
[21] Appl. No.: 444,678
[22] Filed: Nov. 26, 1982
[51] Int. Cl.³ .............................................. A47B 91/00
[52] U.S. Cl. ................................................. 248/188.8
[58] Field of Search .............. 248/188.8, 188.1, 188.2, 248/188.5, 180, 168, 170, 161, 414, 411; 403/363, 372, 325, 109, 104

[56] References Cited

U.S. PATENT DOCUMENTS

| | | | |
|---|---|---|---|
| 880,063 | 2/1908 | Beilfuss | 248/188.5 |
| 2,546,492 | 3/1951 | Booth | 248/188.8 |
| 2,668,682 | 2/1954 | Dalton | 248/188.5 |
| 2,699,668 | 1/1955 | Stein | 248/188.1 |
| 3,051,425 | 8/1962 | Homrighausen | 248/180 |
| 3,718,353 | 2/1973 | Charcharos | 403/109 |
| 4,015,806 | 4/1977 | Cattermole | 248/188.2 |
| 4,174,900 | 11/1979 | Ina | 403/109 |
| 4,199,123 | 4/1980 | Weber et al. | 248/188.2 |
| 4,329,076 | 5/1982 | Coreth | 403/109 |

OTHER PUBLICATIONS

Brochure entitled "Tripods".
Brochure entitled "Sachtler Motion Picture & Video Camera Support Systems".
Heiwa Brochure entitled "Tripod Photo Cine & Video Accessories 'The Sole Technique Since 1950'".
Quick Set Incorporated Brochure entitled "Samson Professional Tripods".
Page from a Brochure with bottom title "The Functional Work Horse for Amateurs and Professionals Studios and Location".
Brochure detailing "Bogen" tripods and dollies, etc.
Quick Set Incorporated Brochure entitled "Hercules Industrial Tripods".
Quick-Set Incorporated Brochure entitled "Super Quick Set the Tripod with a Future".
O'Connor Engineering Labs., Inc. Brochure cover entitled "Quality Wooden Tripods".

Primary Examiner—Ramon S. Britts
Assistant Examiner—Ramon O. Ramirez
Attorney, Agent, or Firm—Wood, Dalton, Phillips, Mason & Rowe

[57] ABSTRACT

An adjustable tripod leg is disclosed having a first leg member with an axial track and a second leg member axially movable with respect to the first. Brake shoes are associated with the second leg member and include means for following the track. Also included is a cam biasing member which selectively biases the brake shoes into frictional contact with the track to prevent relative axial motion of the leg members.

20 Claims, 6 Drawing Figures

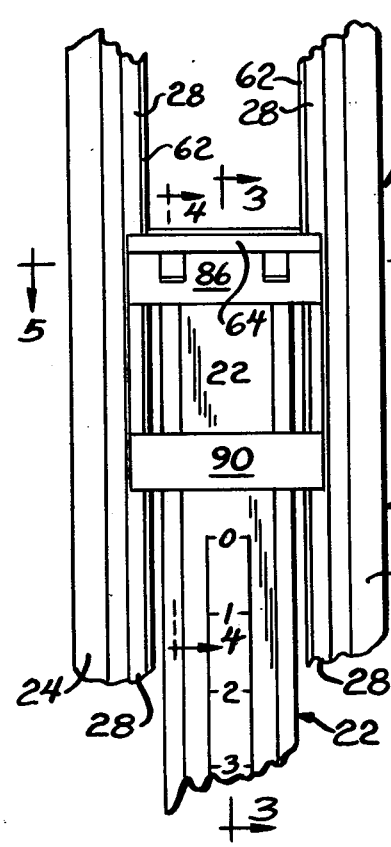
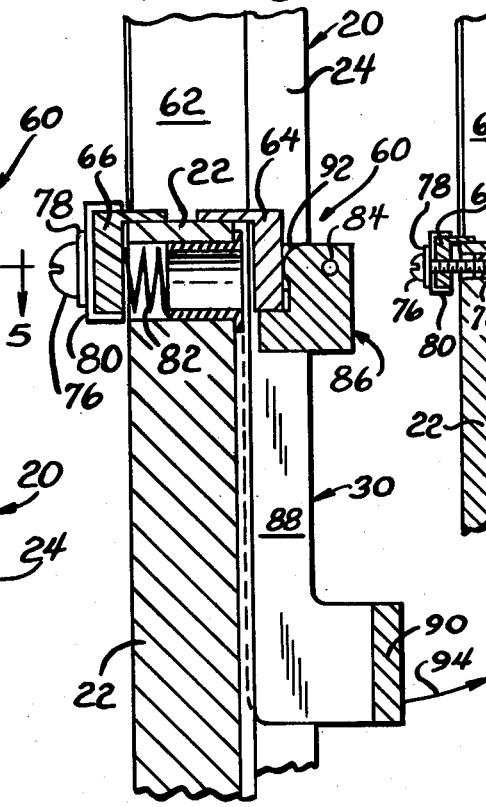
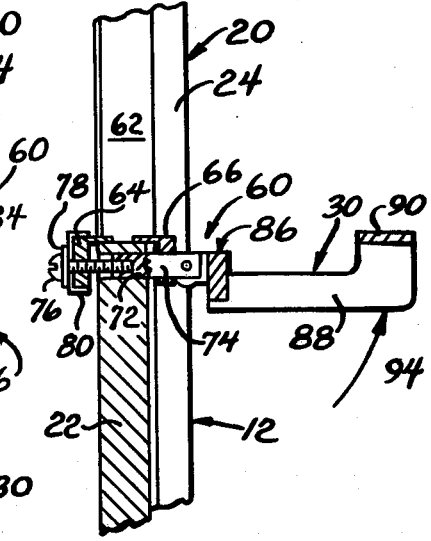
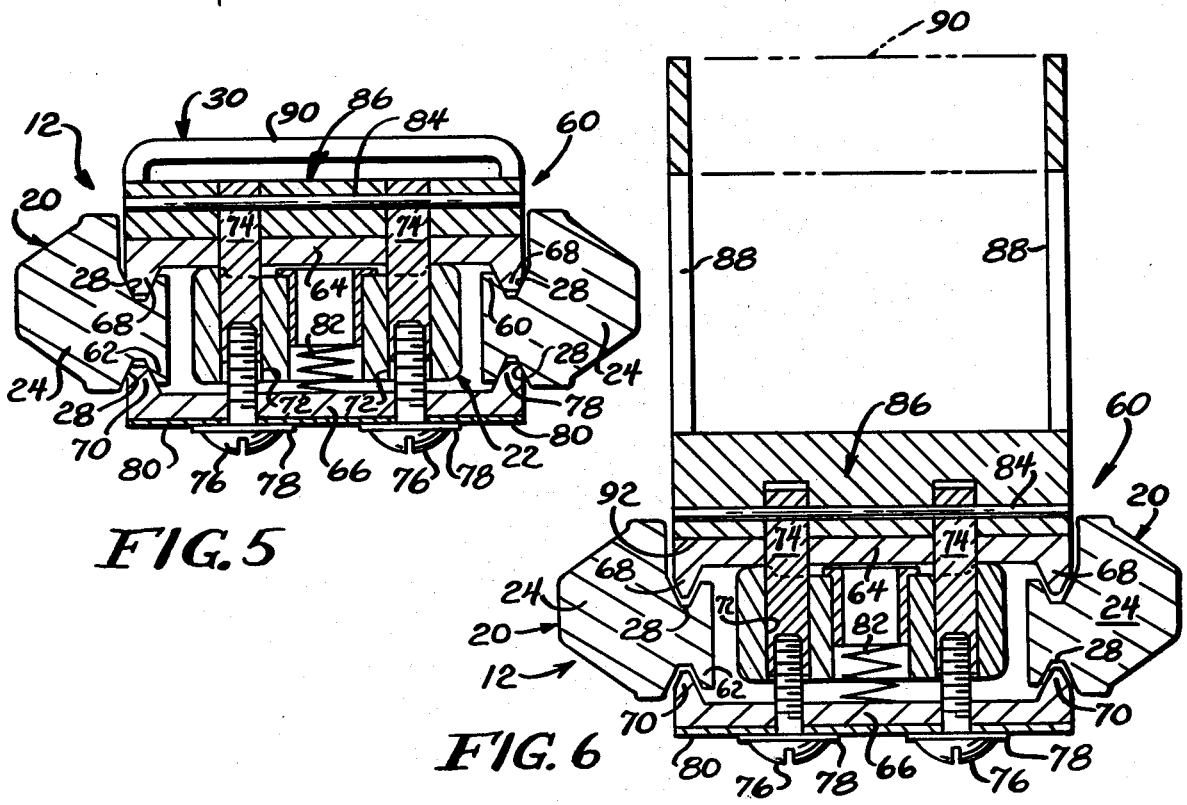

LOCKING TRIPOD LEG

DESCRIPTION

1. Technical Field

This invention relates generally to supporting tripods and more particularly to an adjustable tripod leg having a locking mechanism for locking that leg at the desired length.

2. Background Art

Tripods with adjustable legs are, of course, well known in the art. Mechanisms in the prior art for locking the adjusting legs at a desired length have however presented an assortment of disadvantages. For example, many of the prior art mechanisms use knobs or twisting devices which during use can strip, jam up and in cold weather even feeeze up. Even when properly operating, these mechanisms are still generally slow to lock and in many cases are not sturdy enough to safely support a heavy load. Such characteristics are particularly disadvantageous when a quick set up is required for heavy loads in any kind of weather, as when used with portable news cameras in the field. Also, such prior art mechanisms have required considerable manual force to be applied to lock them firmly. Further, some prior art mechanisms have components which can be impacted and damaged during handling, as for example when thrown and bounced around during transport and before and after use.

The present invention is directed toward overcoming one or more of the problems as set forth above.

SUMMARY OF THE INVENTION

An adjustable tripod leg is disclosed having a first leg member with an axial track and a second leg member axially movable with respect to the first. Brake shoes are associated with the second leg member and include means for following the track. Also included is a cam biasing member which selectively biases the brake shoes into frictional contact with the track to prevent relative axial motion of the leg members.

One object of the present invention is to provide an adjustable tripod leg and locking mechanism which are sturdy enough to withstand heavy loads and yet which may still be easily and simply unlocked and locked for quick set up and adjustment. Another aspect of the present invention is to provide a locking mechanism for a tripod leg which works reliably under all conditions, and which will continue to work reliably over a long lifetime of use, even as components wear. A further object of the present invention is to provide an adjustable tripod leg and locking mechanism in which the working components are protected from damage during handling. Still another object of the present invention is to provide a locking mechanism which may be operated wih minimal effort.

BRIEF DESCRIPTION OF THE DRAWINGS

FIG. 2 is a partial plan view of a tripod leg showing the locking mechanism;

FIG. 3 is a cross-sectional view of the locking mechanism taken along line 3—3 of FIG. 2;

FIG. 4 is a cross-sectional view of the locking mechanism taken along line 4—4 of FIG. 2 except that it shows the mechanism in the unlocked position;

FIG. 5 is a cross-sectional view of the locking mechanism taken along line 5—5 of FIG. 2; and FIG. 6 is a cross-sectional view similar to FIG. 5 but showing the locking mechanism in the unlocked position.

DESCRIPTION OF THE PREFERRED EMBODIMENT

Figure 1:
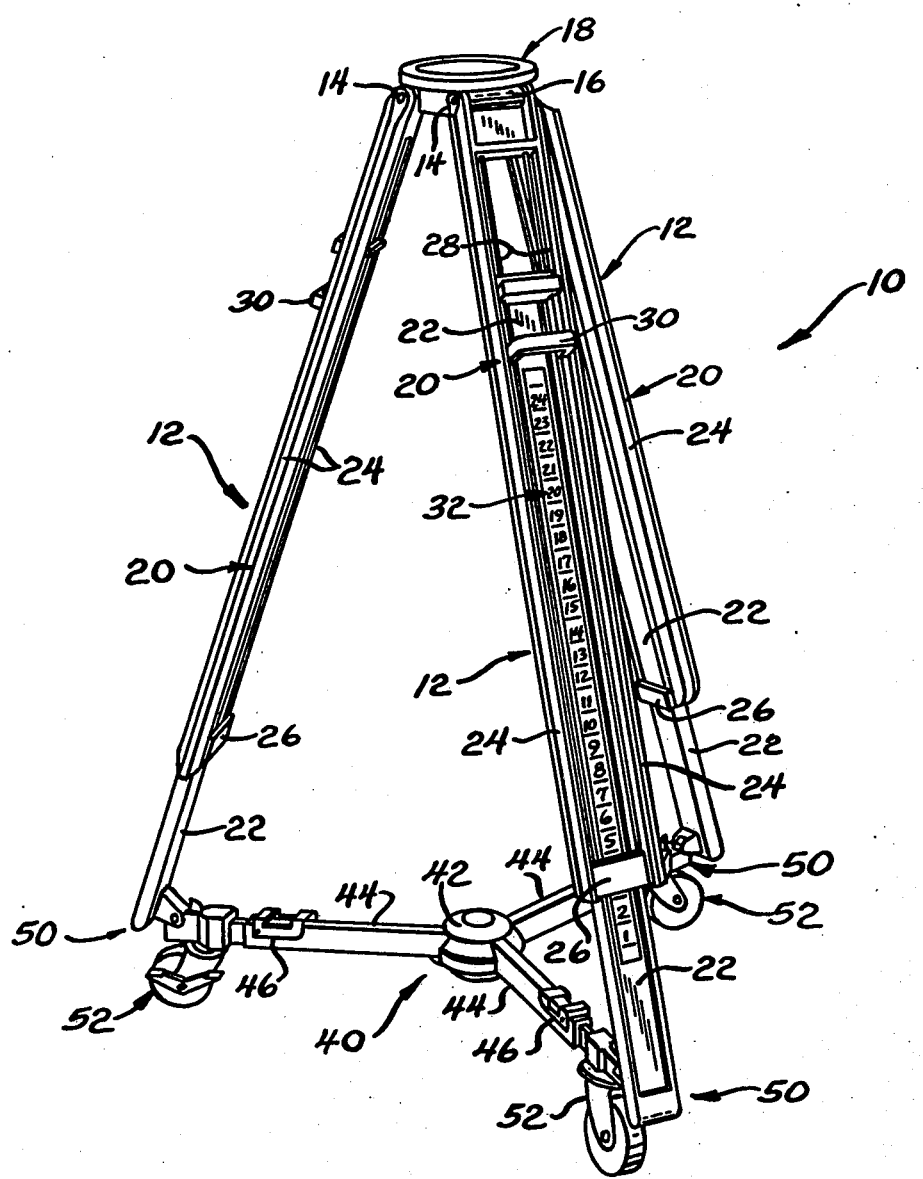
FIG. 1 is a perspective view of a tripod having locking legs.

A tripod 10 having locking legs 12 is shown in perspective in FIG. 1. The legs 12 are pivotably secured in a suitable manner, such as a pin 14 in a sleeve 16, to the tripod plate 18. The type of tripod plate 18 used may differ depending on the intended use, with the tripod plate 18 shown in FIG. 1 being capable of fixing a portable television or film camera.

Each leg 12 has a fixed leg member 20 and a sliding leg member 22. The fixed leg member 20 has a pair of track members 24 which are interconnected at the top and bottom so as to be maintained in a parallel relationship. The interconnection of the track members 24 at the bottom comprises a pair of spaced guiding plates 26 which, together with the track members 24, define a rectangular opening (not seen in the figures). The track members 24 also include V-groove tracks 28 as will be more fully described hereafter.

The sliding leg member 22 slides within the defined rectangular opening of the fixed leg member 20 and is guided at its upper end along the V-groove tracks 28 of the track members 24. The upper end of the sliding leg member 22 not only guides the sliding leg member 22 but it also includes a handle 30 for operating a clamping mechanism which fixes the two leg members 20, 22 together. Details of this mechanism are set forth more fully hereinafter.

Accordingly, the two leg members 20, 22 may be adjusted axially with respect to one another in an essentially telescopic fashion so as to permit adjustment of the overall length of the leg 12. A scale 32 is provided on each sliding leg member 22 to aid in adjusting the overall length of the three legs 12 as desired. One material which has been found to be suitable for these components is Zytel, a tough, high strength nylon resin made by E. I. du Pont de Nemours & Co. Inc. of Wilmington, Del. The tripod 10 as shown also includes a dolly or spreader 40. The tripod 10 can of course be used without a dolly 40. However, in certain uses, particularly on hard, smooth surfaces, the dolly 40 is desirable since it can hold the legs 12 together so as to prevent them from sliding apart and further can be used to support the entire tripod 10 for movement across the surface.

The dolly 40 shown includes a hub 42 from which three spreader legs 44 project. The spreader legs 44 are telescopic to permit adjustment of their lengths, each spreader leg 44 having a locking mechanism with an easily accessible handle 46. At the end of each spreader leg 44 is a snap-lock pushbutton release mechanism 50 which enables the tripod legs 12 to be easily connected to and disconnected from the dolly 40. The locking and release mechanism 50 of each spreader leg 44 also includes a wheel or caster 52 on which the entire apparatus may be rolled. The improved locking mechanism 60 for the tripod legs 12 is shown in detail in FIGS. 2-6, the components of may best be observed first with reference to FIG. 5. The track members 24 have inwardly directed rail portions 62 which define the V-groove tracks 28 which are open toward the front and back of the leg 12. The tracks 28 are recessed so that they won't be impacted when dropped and thus won't get scratched up or otherwise damaged.

Front and rear brake shoes 64,66 extend between the track members 24, each brake shoe 64,66 having mating V-projections 68,70 at its lateral ends which fit within the respective V-groove tracks 28. It is preferable that the V-projections 68,70 be truncated to ensure that they do not seat in the bottom of the V-groove tracks 28 since this would interfere with proper clamping as will be apparent from the description of the operation of the locking mechanism 60 hereafter.

Extending through the front brake shoe 64 and also through bosses 72 formed in the sliding leg member 22 are two clamp rods 74. The clamp rods 74 are permitted to have free axial motion through the front brake shoe 64 and the leg member bosses 72. The rear brake shoe 66 is connected to the clamp rods 74 by a pair of screws 76 with washers 78, which abut against a metal reinforcing plate 80 on the back of the rear brake shoe 66. The screws 76 may be adjusted when assembled to provide the proper clamping force as is discussed hereafter and may further be adjusted throughout the useful life of the tripod 10 to maintain that force despite wear on any of the components. The reinforcing plate 80 is provided to prevent bowing of the rear brake shoe 66 when the clamping force is applied through the clamp rods 74 as will be described.

A compression spring 82 is also disposed through the sliding leg member 22 and between the brake shoes 64,66 to apply a constant biasing force tending to separate the brake shoes 64,66. That force also tends to keep the handle in the unlocked position once it is manually positioned there.

A laterally disposed hinge pin 84 extends through the clamp rods 74. The hinge pin 84 pivotally supports the leg clamping member 86.

The leg clamping member 86 includes the semi-recessed handle 30, which consists of a pair of L-shaped legs 88 interconnected by a handle member 90 (see FIGS. 3 and 4). This handle 30 is thus out of the way when in the clamped position so that it will not break off on impact and yet can be easily used even when wearing bulky gloves.

The leg clamping member 86 also includes a cam surface 92 (best seen in FIG. 3) which abuts against the front brake shoe 64. The cam surface 92 is shaped so that its maximum radius point contacts the front brake shoe 64 with the handle 30 slightly raised from the locked positon. Accordingly, the force of the compression spring 82 and the springback force of the front brake shoe 64 operate to engage the cam surface 92 in an over center manner to positively hold the handle 30 in its locked position.

The locking mechanism 60 is shown in the clamped locked position in FIGS. 2, 3 and 5. With the handle 30 down, the cam surface 92 of the leg clamping member 86 engages against the front brake shoe 64, sliding the front brake shoe 64 over the clamp rods 74 and thus squeezing the two brake shoes 64,66 together. Accordingly, the V-projections 68,70 of both brake shoes 64,66 are biased into the V-groove tracks 28, thereby strongly clamping the two leg members 20,22 together to prevent relative sliding.

The clamping force arises from frictional contact of eight surfaces (two on each V-projections 68,70) and also from the wedging action of the V-projections 68,70 into the V-groove tracks 28. The wedge effect provided by the V-projections 68,70 causes the normal force at the contacting surfaces (which determines the frictional force) to be larger than the force biasing the brake shoes 64,66 together. Accordingly, a large normal force (and thus large frictional force) may be introduced even though the force applied by the clamping member 86 is relatively small.

To release the locking mechanism 60, the handle 30 is pivoted up (as indicated by the arrow 94) so that the locking mechanism 60 takes the configuration of FIGS. 4 and 6. The cam surface 92 retracts from the front brake shoe 64, thereby causing the compression spring 82 to separate the two brake shoes 64,66 unseating their V-projections 68,70 from the V-groove tracks 28. The V-projections 68,70 still however remain within the V-groove tracks 28 (see FIG. 6) sufficiently so that the sliding leg member 22 may be adjusted to change the length of the leg 12. When adjusted, the brake shoes 64,66 thus act with the track members 24 to guide the sliding leg member 22 as it is moved. Once the leg 12 is at the desired length, the handle 30 may then be pivoted back down to lock the mechanism 60 and thereby fix the leg 12 at that length.

Although the above described embodiment is preferred, alternative structures for biasing the brake shoes 64,66 together, such as a screw, could be used and will be apparent to those skilled in the art.

This locking mechanism 60 thus enables a tripod leg 12 to be quickly and easily adjusted to virtually any desired length. The handle has positive locked and unlocked positions, further simplifying operation. At the same time, the mechanism provides an extremely sturdy clamping which enables the tripod 10 to be used to support high loads.

Other aspects, objects and advantages of this invention can be obtained from a study of the drawings, the disclosure and the appended claims.

I claim:

1. In a locking tripod leg having a first leg member and a second leg member received within the first leg member for axial movement with respect to the first leg member, an improved clamping means for locking said leg members against axial movement with respect to one another, said clamping means comprising:
   first and second brake shoes on opposite sides of said first leg member and adapted for engagement with said second leg member;
   a clamp rod extensible through said first leg member and fixed on one end to the first brake shoe;
   a hinge pin fixed to the clamp rod on the end opposite said first brake shoe, said second brake shoe being slidable on said rod between said first leg and said hinge pin; and
   a clamping member pivotable around said hinge pin and having a cam surface engaging with said second brake shoe to bias said brake shoe together and into locking engagement with said second leg member.

2. The improvement of claim 1, further comprising a rigid reinforcing member for said first brake shoe.

3. The improvement of claim 1, further comprising a second clamp rod extensible through said first leg member and fixed on one end to said first brake shoe and on the opposite end to said hinge pin.

4. The improvement of claim 1, further comprising means for adjustably fixing said clamp rod to said first brake shoe.

5. The improvement of claim 1, wherein:

said second leg member includes a pair of interconnected track members, each having a pair of axially aligned V-groove tracks; and each brake shoe includes a pair of mating V-projections receivable within one V-groove track of each track member, whereby said clamping member biases said brake shoe projections into frictional engagement with said V-groove tracks.

6. The improvement of claim 5, wherein said V-groove tracks of each track member are open in directions opposite one another whereby said track members are squeezed between said brake shoes.

7. The improvement of claim 5, wherein said V-projections are truncated.

8. The improvement of claim 5, wherein said V-projections are at opposite ends of each brake shoe and are aligned with the V-projections of the other brake shoe.

9. An adjustable tripod leg comprising:
a first leg member including an axial track;
a second leg member axially movable with respect to said first leg member;
brake shoes associated with said second leg member and including means for following said track; and
means associated with said brake shoes for selectively biasing said following means into frictional contact with said track to prevent relative axial motion of said leg members.

10. The adjustable tripod leg of claim 9, wherein:
said first leg member includes a pair of parallel track members, each track member having two oppositely open V-grooves defining said track; and
said following means comprise a pair of V-projections on each brake shoe, each brake shoe having one V-projections associated with a V-groove on one track member and the other V-projection associated with a V-groove on the other track member.

11. The adjustable tripod leg of claim 10, wherein said V-projections are truncated.

12. The adjustable tripod leg of claim 10, wherein said biasing means bias said brake shoes with respect to one another.

13. The adjustable tripod leg of claim 12, wherein said biasing means bias said brake shoes together.

14. The adjustable tripod leg of claim 10, wherein said V-grooves are recessed within the outer boundary of said first leg member.

15. The adjustable tripod leg of claim 9, wherein said biasing means comprises:
a clamp rod extensible through said brake shoes and said second leg member; and
a cam member pivotable about a hinge fixed with respect to said clamp rod, one of said brake shoes being movable along said clamp rod and said cam member including a cam surface engagable with said movable brake shoe to bias said movable brake shoe with respect to the other brake shoe.

16. The adjustable tripod leg of claim 15, wherein said cam member biases said brake shoes together.

17. The adjustable tripod leg of claim 16, wherein said cam member comprises a pivotable handle semi-recessed with respect to said first leg member when said handle is in a locking position.

18. The adjustable tripod leg of claim 15, wherein:
said first leg member includes a pair of parallel track members, each track member having two oppositely open V-grooves defining said track; and
said following means comprise a pair of V-projections on each brake shoe, each brake shoe having one V-projection associated with a V-groove on one track member and the other V-projection associated with a V-groove on the other track member.

19. The adjustable tripod leg of claim 9, wherein said biasing means includes a handle having an L-shaped arm.

20. The adjustable tripod leg of claim 9, wherein said biasing means has an overcenter cam surface which positively holds said biasing means in its biasing position.

* * * * *